US007591432B2

(12) United States Patent
Torres, Jr.

(10) Patent No.: US 7,591,432 B2
(45) **Date of Patent: *Sep. 22, 2009**

(54) METHOD AND SYSTEM FOR KITTING SMART CARDS WITH A SHRINK WRAP LICENSE

(75) Inventor: Pelegrin Torres, Jr., Lomita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/005,217

(22) Filed: Dec. 26, 2007

(65) Prior Publication Data

US 2008/0105752 A1 May 8, 2008

Related U.S. Application Data

(62) Division of application No. 10/809,158, filed on Mar. 25, 2004, now Pat. No. 7,328,551.

(51) Int. Cl.
*G06K 19/02* (2006.01)

(52) U.S. Cl. ........................ 235/488; 235/375; 235/487

(58) Field of Classification Search ................. 235/488, 235/487, 380, 375, 451, 492
See application file for complete search history.

(56) References Cited

U.S. PATENT DOCUMENTS

| | | | | |
|---|---|---|---|---|
| 1,670,343 | A | | 5/1928 | Clemens |
| 2,307,890 | A | | 1/1943 | Lakso |
| 2,600,216 | A | | 6/1952 | Denison |
| 3,484,097 | A | | 12/1969 | Jory |
| 3,508,702 | A | | 4/1970 | Kaiser |
| 3,704,015 | A | | 11/1972 | Holovka, Jr. et al. |
| 3,726,471 | A | | 4/1973 | Kalb |
| 4,034,210 | A | | 7/1977 | Hill et al. |
| 4,124,965 | A | | 11/1978 | Stahl |
| 4,141,400 | A | | 2/1979 | Mangan |
| 4,564,880 | A | | 1/1986 | Christ et al. |
| 4,601,157 | A | | 7/1986 | Adelman |
| 4,707,414 | A | | 11/1987 | Long et al. |
| 4,722,376 | A | | 2/1988 | Rhyner |
| 4,905,831 | A | | 3/1990 | Bagdis et al. |
| 4,917,240 | A | * | 4/1990 | Roberts et al. ............. 206/232 |
| 5,541,395 | A | | 7/1996 | Hill et al. |
| 5,720,158 | A | | 2/1998 | Goade, Sr. |
| D394,387 | S | | 5/1998 | Williams |
| 5,788,898 | A | | 8/1998 | Nishimura et al. |
| 6,042,149 | A | | 3/2000 | Roshkoff |
| D422,210 | S | | 4/2000 | Sturkie et al. |

(Continued)

FOREIGN PATENT DOCUMENTS

| | | |
|---|---|---|
| EP | 1091327 | 4/2001 |

(Continued)

*Primary Examiner*—Edwyn Labaze

(57) ABSTRACT

Smart Cards are kitted by preprinting a piece of film with a licensing agreement, wrapping the film around the Smart Card and sealing the package. The kitted Smart Card is much smaller and thus easier and cheaper to store and transport than standard #10 envelopes. The assembly process reduces damage to the Smart Cards caused by bending, scratching, static electricity and physically contacting the module, hence reduces replacements costs. These advantages are considerable when viewed in the context of kitting, storing and transporting hundreds of thousands to millions of Smart Cards for single applications such as DIRECTV access cards, American Express Blue Cards, medical history cards, etc.

7 Claims, 7 Drawing Sheets

U.S. PATENT DOCUMENTS

| | | | | |
|---|---|---|---|---|
| 6,105,861 | A | 8/2000 | Kuit | |
| 6,209,779 | B1 | 4/2001 | Fabel | |
| 6,224,108 | B1 | 5/2001 | Klure | |
| 6,270,012 | B1 | 8/2001 | Dawson | |
| 6,454,165 | B1 | 9/2002 | Dawson | |
| 6,522,945 | B2 | 2/2003 | Sleep et al. | |
| 6,899,276 | B2 | 5/2005 | Limelette et al. | |
| 6,928,794 | B2 | 8/2005 | Hamer et al. | |
| 7,055,740 | B1 * | 6/2006 | Schultz et al. | 235/381 |
| 7,234,639 | B2 * | 6/2007 | Schultz et al. | 235/380 |
| 7,343,357 | B1 * | 3/2008 | Kara | 705/401 |
| 2003/0085161 | A1 | 5/2003 | Smith et al. | |
| 2003/0150753 | A1 * | 8/2003 | Fraser et al. | 206/308.1 |
| 2003/0155423 | A1 * | 8/2003 | Limelette et al. | 235/492 |
| 2005/0140495 | A1 | 6/2005 | Yamazaki et al. | |

FOREIGN PATENT DOCUMENTS

| | | |
|---|---|---|
| WO | WO 01/43101 | 6/2001 |

* cited by examiner

METHOD AND SYSTEM FOR KITTING SMART CARDS WITH A SHRINK WRAP LICENSE

CROSS REFERENCE TO RELATED APPLICATIONS

This application is a divisional of U.S. patent application Ser. No. 10/809,158, filed Mar. 25, 2004 now U.S. Pat. No. 7,328,551, entitled "METHOD AND SYSTEM FOR KITTING SMART CARDS WITH A SHRINK WRAP LICENSE" by Pelegrin Torres, Jr., which application is hereby incorporated by reference herein.

BACKGROUND OF THE INVENTION

1. Field of the Invention

This invention relates to the "kitting" of Smart Cards and more specifically to a method of and equipment for packaging the Smart Cards with a film that is preprinted with the licensing agreement.

2. Description of the Related Art

Smart Cards are being used as a means for securely storing and communicating large amounts of personalized data in essentially a credit card. Smart Cards are being used for bank and credit services, medical history, transportation, and as access cards to enable secured devices or networks. A smart card is embedded with a module that contains an integrated circuit chip. The module is configured to interface with some type of a card reader. A "non-contact" card interfaces using, for example, IR. A "contact" card includes contact pads that would mate with pins on the card reader. The Smart Cards are relatively expensive and fragile. The IC chip and module are sensitive to bending, scratching and static electricity. The replacement cost due to damage caused during packaging and distribution is high.

In many of the applications contemplated for Smart Cards, it is desirable to package the Smart Card with some form of a Licensing Agreement, typically known as a "shrink wrap license". By opening the package and using the Smart Card, the user accepts the terms of the license, which may include terms of use, payment terms, limitation on liability, acknowledgement of intellectual property rights, etc. To be valid the licenses should be prominent, readable, complete and clearly associated with the acceptance and use of the Smart Card.

One way of packaging individual Smart Cards with a shrink wrap license agreement is to print the licensing agreement on the front of a standard #10 envelope, attach the Smart Card to a carrier of approximately the same size as the envelope and seal the Smart Card inside the envelope. In the case of a DirecTV access card, the back of the envelope is provided with a window so that a bar code on the card may be read during handling and distribution without opening the envelop. These envelopes are typically sent in bulk to distributors, OEMs, etc. that incorporate them into other products and services and then distribute them to customers. For daily mailings direct to the customer, either the printed envelop can be placed into, for example, a larger FedEx envelope or the licensing agreement can be printed on the carrier and tape that hold the card and packaged into a #10 envelope using an industry standard mailing machine.

A #10 envelop is much larger than a typical Smart Card and thus more difficult and expensive to store and transport in large volumes. This size of envelop is used for two reasons. First, the envelopes and the equipment for "kitting" the Smart Card into the envelope is standard equipment for vendors. Second, a typical licensing agreement in a readable font size will not fit on the front of card sized envelopes.

By way of example, DIRECTV® provides access cards that are encoded with certain identification, service and security information for use with their integrated receiver decoder (IRD) set-top boxes and digital video recorders (DVRs) to provide secure satellite television services. DIRECTV requires that every Smart Card it distributes to IRD manufacturers and dealers be accompanied by a licensing agreement to provide protection for the proprietary and sensitive materials incorporated into the software in the Smart Card. The access cards are expensive, fragile and produced in the tens to hundreds of thousands for typical applications and even into the millions for DIRECTV access cards.

Currently, DIRECTV sends crates full of access cards to an outside vendor for kitting. The vendor mounts each card on an insert and seals it into a #10 envelope with a preprinted licensing agreement on the front. A window on the back of the envelope provides access to read the bar code on the access card. The vendor then recreates the sleeves of 500 and returns them to DIRECTV where they are stored in a large warehouse. Kitted Smart Cards in sleeves are placed in a shipping crate with many other boxes/sleeves and shipped to an IRD/DVR OEM. The OEM reads the bar code of the access card and marries it to a particular IRD/DVR and keeps them in stock. The OEM will then distribute the IRD/DVR with its unique access card to retailers or professional installers. Eventually, the system is installed in a customer's home at which time the user breaks the seal on the envelope to insert the card into the IRD/DVR to activate the system. The act of breaking the seal signifies the user's acceptance of the licensing agreement.

There is a large and growing need in the industry to find a more cost effective technique for "kitting" smart cards with a shrink wrap license that minimizes damage to the cards and reduces the cost of storing and transporting the cards.

SUMMARY OF THE INVENTION

The present invention provides a space efficient and less expensive method and system for kitting the Smart Cards with a shrink wrap license agreement.

This is accomplished by preprinting a film with the licensing agreement, wrapping the film around the Smart Card and sealing the package. The film can be formed of any suitable material that can be legibly printed and efficiently wrapped and sealed. For example, paper, plastic or a polypropylene/polyethylene composition. The package may be sealed with tape or with the application of heat.

To use the Smart Card the customer must break the seal thereby accepting the terms and conditions of licensing agreement. To ensure that the license is sufficiently prominent and legible, the footprint of the printed text will typically be both wider and longer than the footprint of the card. To accommodate this feature of the license, the package may be made wider than the card and the text allowed to wrap around the card front-to-back. The film may be provided with a window of clear film in the text of the license agreement that is aligned to a bar code on the Smart Card to facilitate reading of the bar code.

In an exemplary embodiment, specialized equipment is used to package a large number of Smart Cards cost effectively to avoid bending, scratching, mechanically damaging the card, to reduce static problems and to properly align the license agreement to the Card. The assembly line includes at least one card feeder for holding a number of Smart Cards. A feeder mechanism feeds the Smart Cards onto the conveyor belt with minimum contact with the module. This is done by routing out the roller on the feeder mechanism so the card passes onto the conveyer belt without the module being touched. The rollers grip the plastic surrounding the module rather then the area where the module sets within the card body. At least one spool of film feeds a preprinted polypropylene/polyethylene film with the Smart Cards to a wrapping stage that aligns and wraps the film around the Smart Card to form a spine. A sealing stage seals and cuts film at either end of the spine to produce a kitted Smart Card. To avoid interruption of the line, a second card feeder and a second spool are typically provided. To reduce static, the film may be passed over an anti-static bar prior to wrapping.

These and other features and advantages of the invention will be apparent to those skilled in the art from the following detailed description of preferred embodiments, taken together with the accompanying drawings, in which:

DETAILED DESCRIPTION OF THE INVENTION

The current technique provides a space efficient and less expensive method and system for kitting the Smart Cards with a shrink wrap license agreement. To use the Smart Card the customer must break the seal thereby accepting the terms and conditions of licensing agreement. The technique reduces damage to the Smart Cards caused by bending, scratching, static electricity and physically contacting the module, hence reduces replacements costs. The kitted Smart Card is much smaller and thus easier and cheaper to store and transport. These advantages are considerable when viewed in the context of kitting, storing and transporting hundreds of thousands to millions of Smart Cards for single applications such as DIRECTV access cards, American Express Blue Cards, medical history cards, etc.

Figure 1:
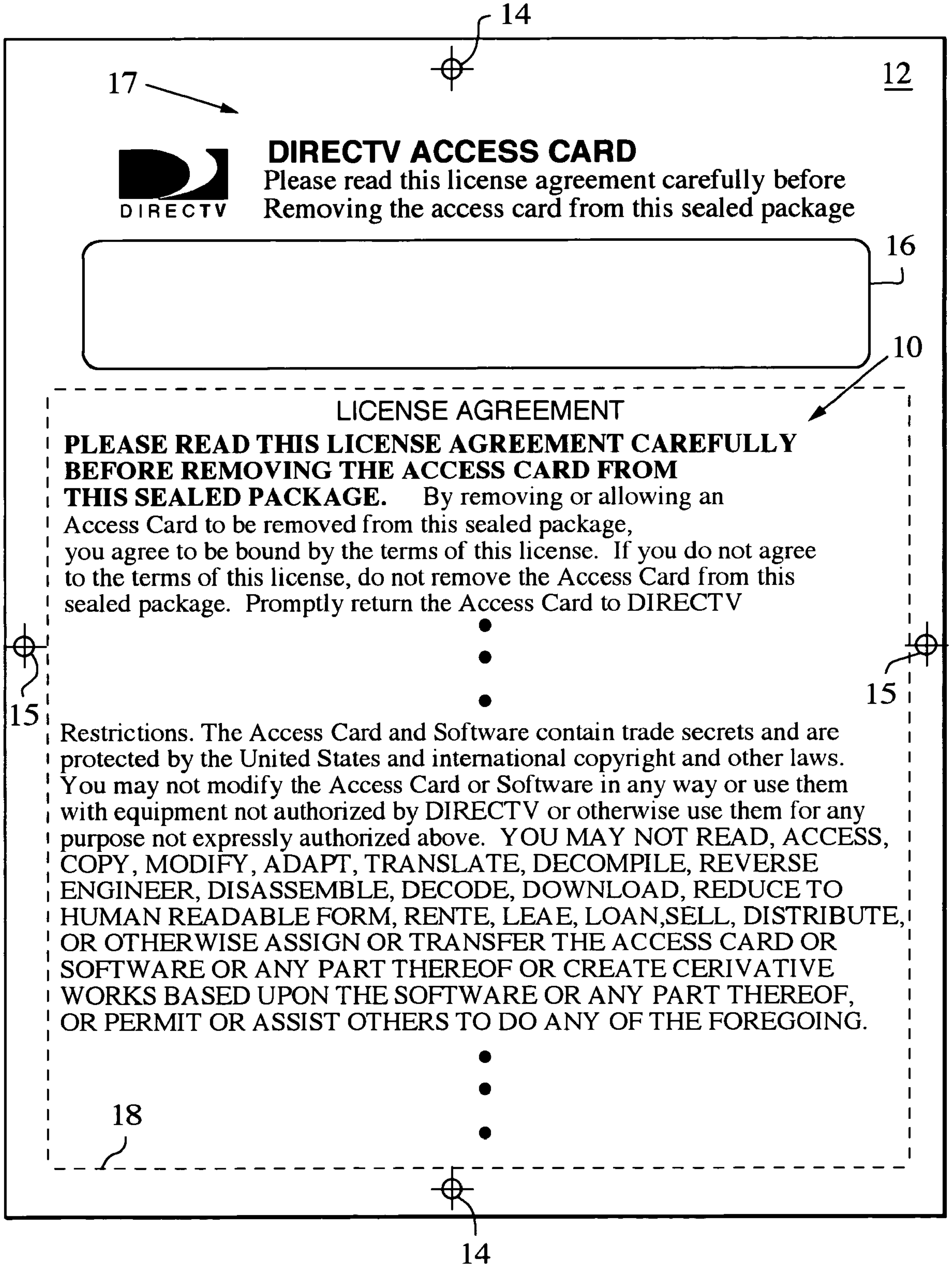
FIG. 1 is a view of a piece of film preprinted with a shrink wrap license.

As shown in FIG. 1, a shrink wrap license agreement 10, suitably the same license that was printed on the #10 envelope, is printed onto a piece of film 12, suitably 126 mm×174 mm to wrap around a card. The film typically includes "fold" alignment markers 14 and "cut" alignment markers 15 that will be used in volume production to align the license to a card. As this particular film is printed with a license for a DIRECTV Access Card it includes a clear window 16 that will be aligned to a bar code on the Smart Card during kitting. This allows the bar code to be read during handling without having to break the seal on the license. A header 17 including the service provider logo and product label is suitably printed above the window.

The "film" should be formed from a material that can be legibly printed with text, made thin enough to be wrapped around a card, durable enough to avoid damage to either the license agreement or the Smart Card and capable of being sealed. Suitable materials might include papers, plastics or other composite materials. In one embodiment, the film is a 0.50 to 1.75 mil thick plastic (polypropylene/polyethylene composition) that is white with black text. The film may be coated with a substance either liquid or some type of layer to reduce static electricity. The license must be printed with a font size that is large enough to be prominent and legible to a user, typically at least 6.5 point. As such a typical license 10 will define a footprint 18 that is considerably larger than the dimensions of the card. A standard credit card sized Smart Card is 54 mm×85.6 mm (Avg. per ISO 7810). The text footprint 18 is, for example, 117 mm×174 mm.

As shown in FIGS. 2*a* through 2*d*, a kitted Smart Card 20 includes a Smart Card 22 that is wrapped and sealed (not typically air tight) inside a package 23 formed by the film 12. Smart Card 22 includes an embedded module 24 containing an integrated circuit (IC) chip that contains information of some type, e.g. banking, credit, medical, network service and access, etc. For many applications, the Smart Card is also provided with a bar code 26, typically to allow identification of each unique Card. The Smart Card 22 is by convention but not necessarily the size of a standard credit card. The kitted Smart Card is approximately ⅓ the size of a standard No. 10 envelope. This greatly simplifies the task of handling, storing and transporting large volumes of Smart Cards.

To display the text 28 of licensing agreement 10 legibly and prominently, the text 28 suitably wraps around Smart Card 22 from front-to-back and the footprint of package 23 is oversized, primarily left-to-right but potentially top-to-bottom as well. For a standard credit card sized Smart Card, the package is at least 55 mm×87 mm, at most 85 mm×145 mm and typically about 67 mm×126 mm. Packaging dimensions are determined by the size of the given text to be printed on the film used in the Kitting process. Bar code 26 is readable through window 16. If packaged in this manner, the Smart Card 22 can move around inside package 23. If Smart Cards with a larger footprint and/or licensing agreements with a smaller footprint are used the package may be snug around the card. To use the Smart Card the customer must "break the seal" thereby accepting the terms and conditions of licensing agreement.

Figure 2A:
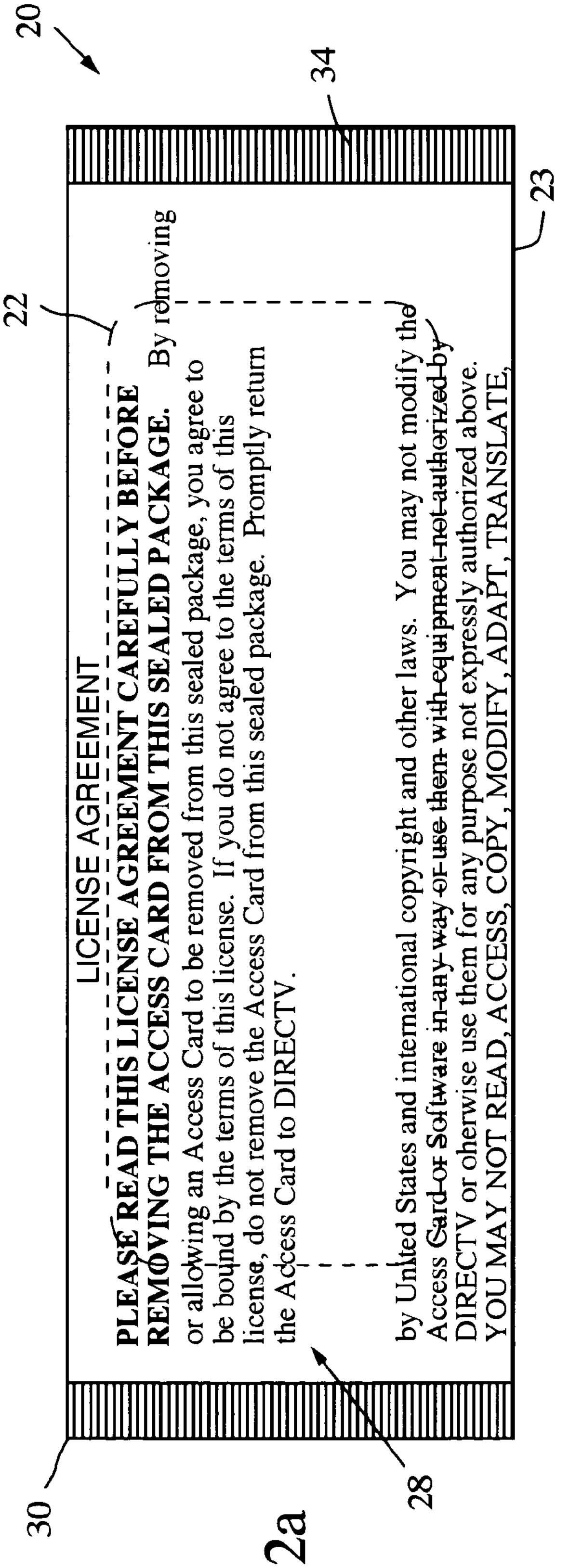
FIGS. 2*a* through 2*d* are front, back, end and side views of a kitted Smart Card.
Figure 2B:
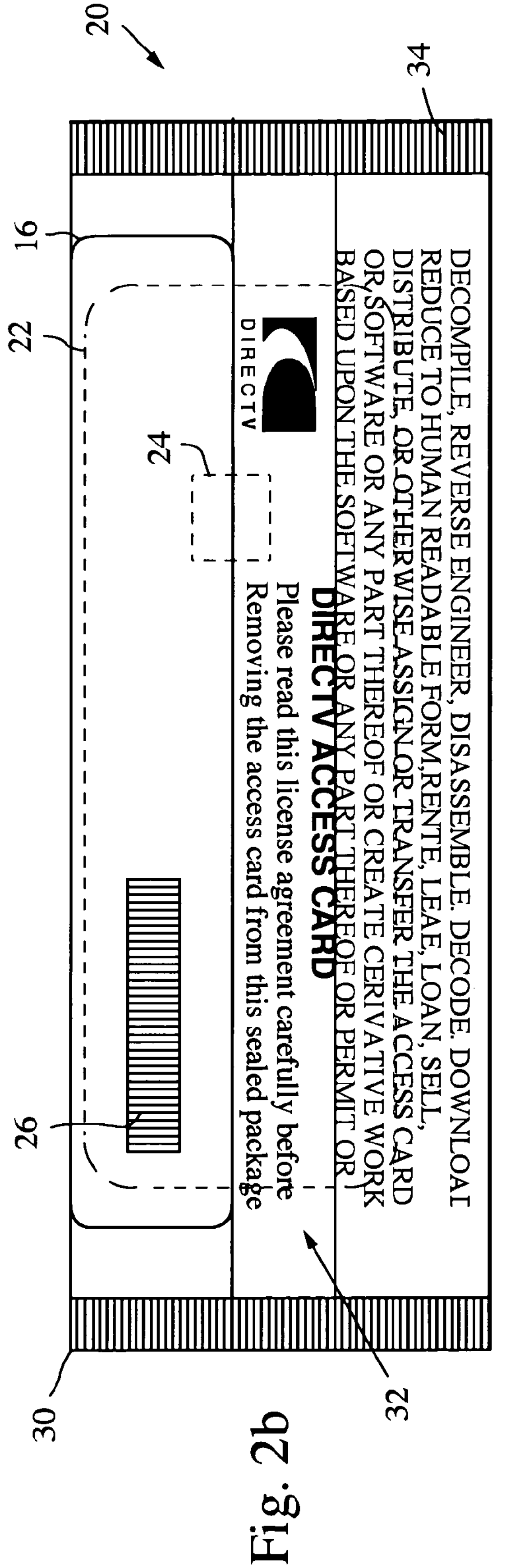
Figure 2C:
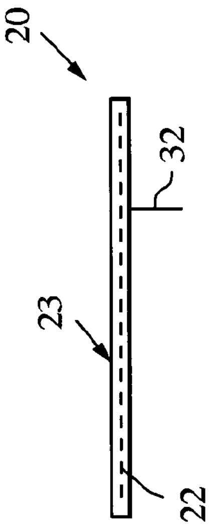
Figure 2D:
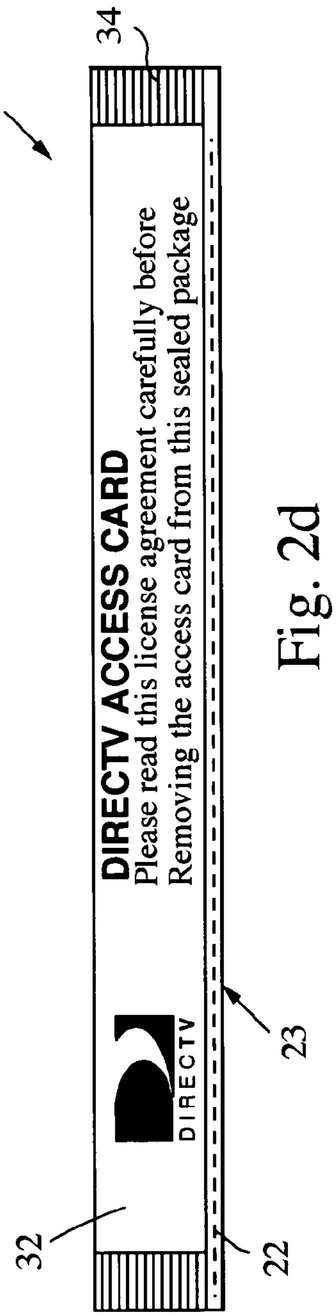

In the particular embodiment shown in FIG. 1, licensing agreement 10 is laid out in a certain format on film 12; header 17 at the top, window 16 below the header, and the text 28 below the window. Film 12 is then aligned to Smart Card 22 using fold markers 14 so that the text 28 starts at one edge 30 on the front of the Card (FIG. 2*a*) and wraps around front-to-back to a spine 32 (formed by wrapping and sealing the film) on the back of the Card (FIGS. 2*b* and 2*c*). The header 17, e.g. the DIRECTV logo and "DIRECTV ACCESS CARD", is printed on spine 32 (FIG. 2*d*). The spine 32 will typically fold down as shown in FIG. 2*b* and cover a small portion of the text 28 at the end of the licensing agreement. The film is heated and cut to form a seal 34 at each end of package 23.

Figure 3B:
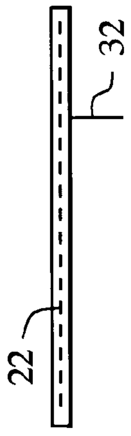
FIGS. 3*a* through 3*c* illustrate a method of kitting Smart Cards by wrapping and sealing them with the film.
Figure 3C:
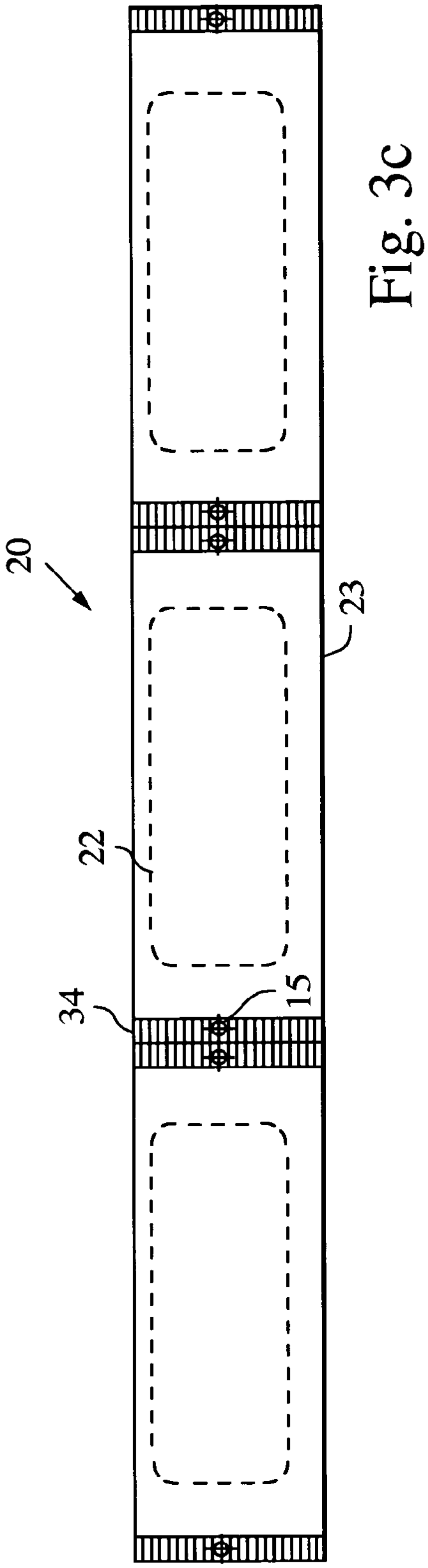
Figure 3A:
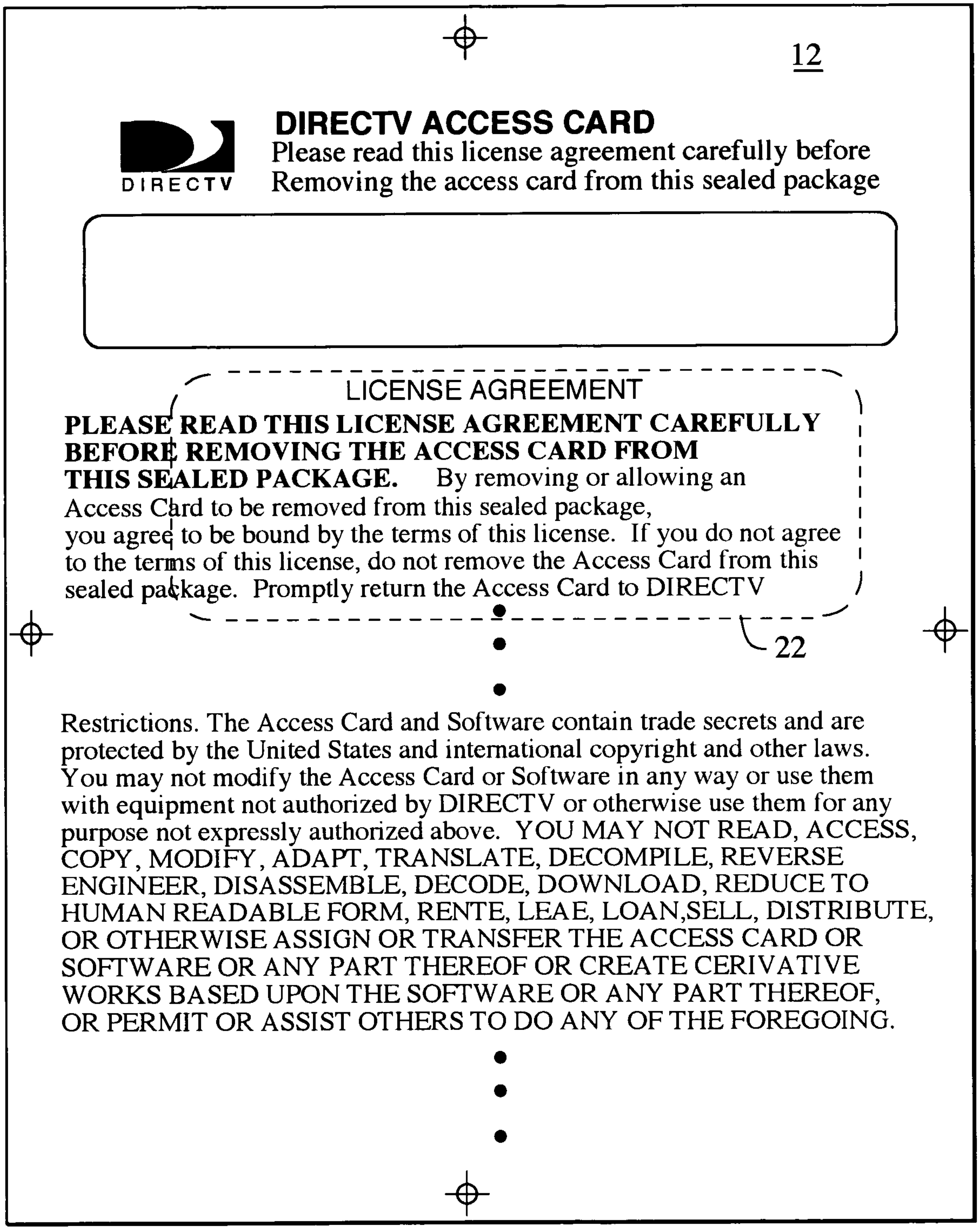

As shown in FIGS. 3*a* through 3*c*, the basic process for "kitting" a Smart Card 22 includes the steps of aligning the film 12 to the Card 22, wrapping the film around the Card to form spine 32 and sealing & cutting the film to form package 23. As shown in FIG. 3*a*, film 12 is laid over the front of the Smart Card and aligned so that the top of licensing agreement text "LICENSE AGREEMENT" is aligned to edge 30. As shown in FIG. 3*b*, film 12 has been wrapped along a long axis of the Smart Card so that the fold markers 14 are joined at the back of the card to form spine 32, which is suitably heat sealed. As shown in FIG. 3*c*, the film 12 between successive Cards has been heated to form seals 34. The film is then cut at cut markers 15 to provide the individually packaged Smart Cards with a shrink wrap license.

To kit tens of thousands up to millions of Smart Cards for a given application the kitting process must be automated.

The equipment used in the assembly line must be designed to handle the Smart Cards without bending or scratching the card, contacting the module or exposing it to static electricity. Furthermore, the assembly process must properly align the text of the license agreement and perhaps a window to the Smart Card. For certain applications, the Smart Cards must be kept in a defined order to track the cards.

Figure 4A:
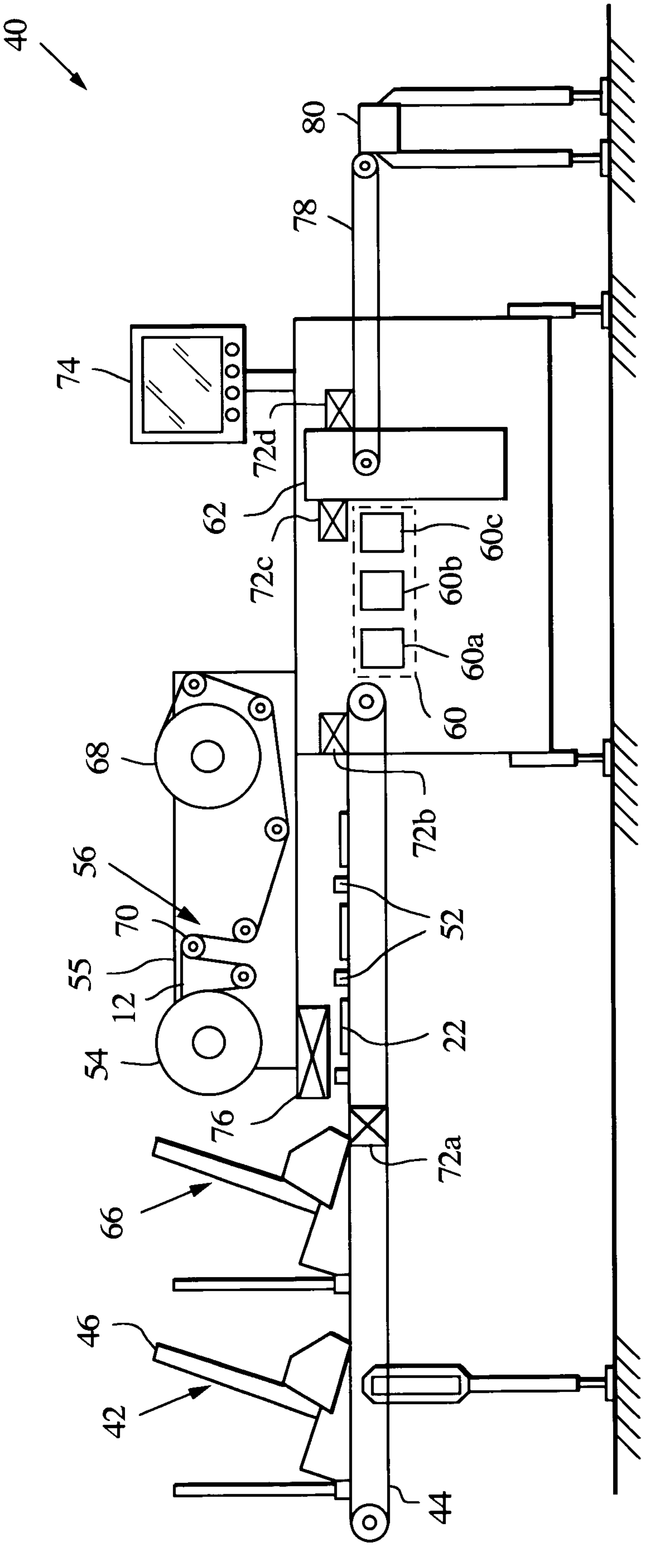
FIGS. 4*a* and 4*b* are side and plan views of an embodiment of a kitting machine.
Figure 4B:
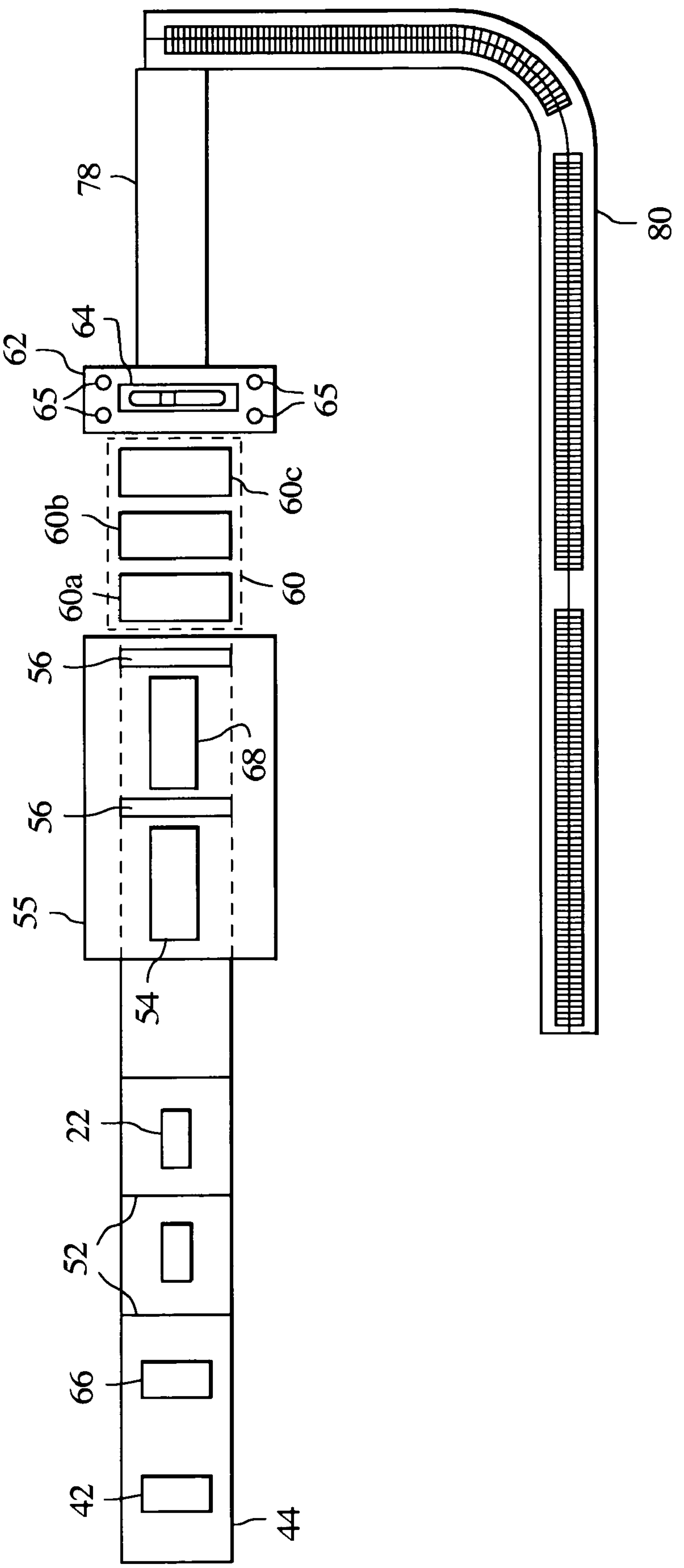
Figure 5B:
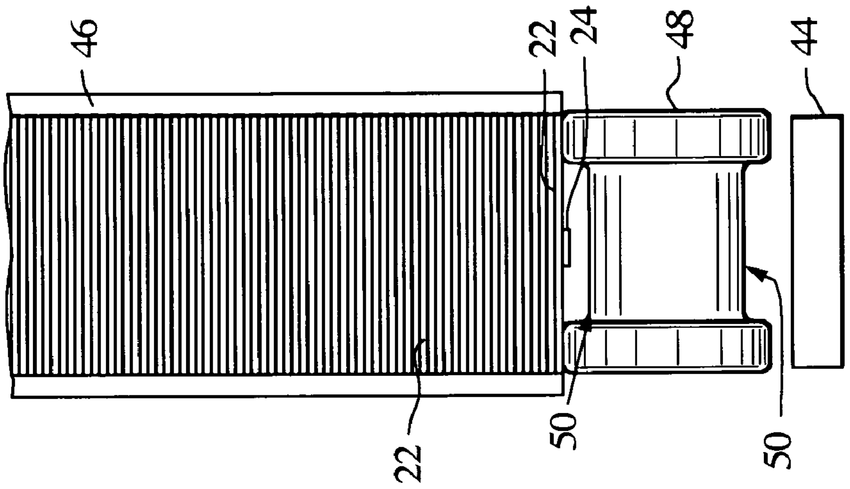
FIGS. 5*a* and 5*b* are detailed side and back views of the card feeder.
Figure 5A:
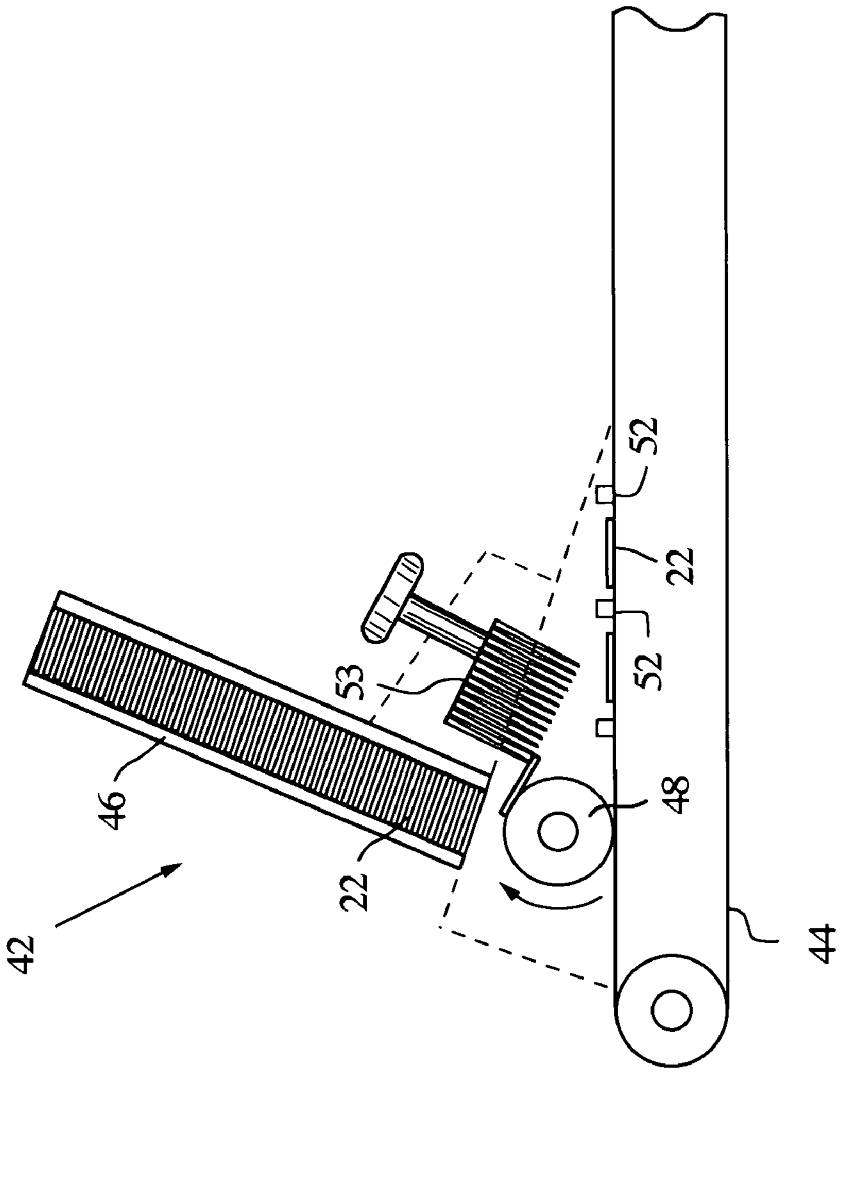

As shown in FIGS. 4 and 5, an assembly line 40 for kitting Smart Cards includes at least one card feeder 42 for holding a stack of Smart Cards 22 and feeding the Smart Cards onto a first conveyor belt 44. As best shown in FIGS. 5*a* and 5*b*, card feeder 42 includes a removable cartridge 46 for holding a stack of Smart Cards 22. A roller 48 having a recessed region 50 grips the Card 22 on either side of module 24 and pulls the Card onto conveyor belt 44 where it is placed "module down" between markers 52 on the belt. This avoids contact with, hence damage to the module 24. Brushes 53 keep the Cards from flying off the line.

As shown in FIGS. 4*a* and 4*b*, at least one spool 54 mounted on a housing 55 feeds the film 12 that has been printed with many instances of the licensing agreement 10 through a system of rollers 56 to a wrapping stage 60. The wrapping stage takes the Smart Cards from the conveyor belt, aligns the licensing agreement 10 and wraps the film around the Smart Card to form spine 32. Wrapping stage 60 includes a first stage 60*a* that brings the edges together forming the bottom edge or spine, a second stage 60*b* that heats the edges of the spine and a third stage 60*c* that completes the seal for the spine portion of the kit.

A secondary sealing stage 62 seals and cuts the wrapped film ends to produce a kitted Smart Card. All Smart cards are kitted sequentially. The sealing stage 62 suitably includes jaws 64 for holding the card and cutting the foil and a heating mechanism 65 for heat sealing the film. Alternately, a tape dispenser could be used seal the film.

To avoid interruption of the line, a second card feeder 66 and a second spool 68 are typically provided. To reduce static, the film is passed over an anti-static bar 70 prior to wrapping. To maintain alignment and detect any problems in the line, a number of sensors are placed along the line to detect such parameters as pressure, heat, speed, and alignment of the cards 22, relative position of the markers 14 and 15 on the film to the cards, and the alignment and temperature of the jaws 64. For example, sensors 72*a* at the card feeder determine whether the Smart Card is lying flat on the conveyor belt between markers 52. Sensors 72*b* at the end of conveyor belt 44 determine whether the film is present. Sensors 72*c* at the output of wrapping stage 60 determine whether the spine 32 has been formed. Sensors 72*d* in the cutting stage 62 determine whether the package is unobstructed by the Smart Card at cut markers 15. A computer 74 monitors the sensor data and adjusts such variables as how fast cards are fed onto the belt, the speed of the belt, feeding of the film and temperature of the heating mechanism.

In some applications such as the DIRECTV Access Cards it is important to maintain or know the order that the cards are fed onto the conveyor belt and output from the assembly. If the card includes a bar code, a bar code scanner 76 can be positioned on the line to read the bar code and report back to the computer 74. Otherwise, the line can be configured so that cards are fed from only one card feeder 42 or 66 at a time to maintain a defined order. The kitted Smart Cards are placed onto a second conveyor belt 78 that moves the kitted Smart Cards away from sealing stage 62 to a third conveyor belt 80 that delivers the kitted Smart Cards in order to a packaging stage (not shown).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A kitted Smart Card, comprising:

a Smart Card comprising an embedded electronic module for storing information, said module configured to interface with a card reader; and a sealed polypropylene/polyethylene package around the Smart Card, said package being printed with a licensing agreement for the Smart Card;

wherein said package comprises an 0.50 to 1.75 mil thick anti-static treated polypropylene/polyethylene film that when broken by a customer indicates acceptance of the terms and conditions of the licensing agreement.

2. The kitted Smart Card of claim 1, wherein the licensing agreement has a footprint that is larger than that of the Smart Card, said licensing agreement wrapping around front-to-back and/or extending side-to-side wider than said Smart Card.

3. The kitted Smart Card of claim 1, wherein the Smart Card has an imprinted identification, said package having a window in the film that overlays the identification.

4. The kitted Smart Card of claim 3, wherein the imprinted identification is a bar code.

5. The kitted Smart Card of claim 3, wherein the package includes a header that appears on a spine, the window overlays the imprinted identification and the license agreement wraps around the Smart Card front-to-back.

6. A kitted Smart Card, comprising:

a Smart Card having an embedded electronic module that is configured to interface with a card reader and having an imprinted identification, said embedded module encoded with certain identification, service and security information for use with an integrated receiver decoder (IRD) set-top boxes and a digital video recorder (DVR) to provide secure satellite television services;

a sealed anti-static treated polypropylene/polyethylene 0.50 to 1.75 mil thick film package around the Smart Card, said package having a window in the film that overlays the imprinted identification and being printed with a licensing agreement for the Smart Card that when broken by a customer indicates acceptance of the terms and conditions of the licensing agreement.

7. The kitted Smart Card of claim 6, wherein the Smart Card is approximately 54 mm by 85.6 mm and said package is at least 55 mm by 87 mm and no greater than 85 mm by 145 mm.

* * * * *